United States Patent [19]

Ito

[11] Patent Number: 5,346,352

[45] Date of Patent: Sep. 13, 1994

[54] FREIGHT MOVING APPARATUS IN CARRIER VEHICLE

[75] Inventor: Michio Ito, Toyama, Japan

[73] Assignee: Yoshida Kogyo K.K., Tokyo, Japan

[21] Appl. No.: 836,373

[22] Filed: Feb. 18, 1992

[30] Foreign Application Priority Data

Feb. 19, 1991 [JP] Japan .................. 3-46134

[51] Int. Cl.⁵ .................................. B65G 67/04
[52] U.S. Cl. .................... 414/400; 198/718; 414/395; 414/396; 414/514; 414/398
[58] Field of Search ............ 414/390, 391, 392, 395, 414/398, 400, 514, 492, 495, 494, 498, 500, 499, 280, 661, 396; 198/718, 725, 719, 733, 728, 748

[56] References Cited

U.S. PATENT DOCUMENTS

| | | | |
|---|---|---|---|
| 2,718,972 | 9/1955 | Temple | 414/396 X |
| 3,250,408 | 5/1966 | Daniluk et al. | 414/396 |
| 3,379,324 | 4/1968 | Wallace et al. | 414/396 |
| 3,526,331 | 9/1970 | Marshall et al. | 414/499 X |
| 3,710,961 | 1/1973 | Bomstein | 414/396 |
| 3,913,757 | 10/1975 | Lovey | 414/390 |
| 4,715,766 | 12/1987 | Gebhardt | 414/392 |
| 4,718,810 | 1/1988 | Hoehn et al. | |
| 4,808,058 | 2/1989 | Carney et al. | 414/396 X |
| 5,063,648 | 11/1991 | Yonezawa et al. | 414/499 X |
| 5,082,415 | 1/1992 | Hayashi | 414/392 X |
| 5,186,596 | 2/1993 | Boucher et al. | 414/395 |

FOREIGN PATENT DOCUMENTS

| | | | |
|---|---|---|---|
| 367713 | 7/1982 | Austria . | |
| 20149 | 12/1980 | European Pat. Off. | 198/718 |
| 595225 | 2/1978 | U.S.S.R. | 198/718 |
| WO89/03802 | 5/1989 | World Int. Prop. O. . | |

Primary Examiner—Frank E. Werner
Attorney, Agent, or Firm—Hill, Steadman & Simpson

[57] ABSTRACT

A freight moving apparatus comprising: a conveyor for receiving a freight and conveying the freight between a first predetermined position in a carrier vehicle and a second predetermined position in a freight station; an electric motor for driving the conveyor; stops disposed in the carrier vehicle and the freight station for engagement with the freight when the freight arrives at the first predetermined position or the second predetermined position; and a torque limiter for detecting any change of torque of the electric motor, which may be caused in the electric motor when the freight comes into engagement with the stops at the first predetermined position or the second predetermined position, to deactivate the electric motor.

2 Claims, 3 Drawing Sheets 5,346,352

FREIGHT MOVING APPARATUS IN CARRIER VEHICLE

BACKGROUND OF THE INVENTION

1. Field of the Invention

This invention relates to a freight moving apparatus to be mounted in a trackless carrier vehicle for moving a freight or an article of freight from a predetermined position in the carrier vehicle to a predetermined position in a freight station in a factory or a warehouse and vice versa.

2. Description of the Related Art

There are currently known various kinds of freight moving apparatuses to be mounted in a carrier vehicle for automatically loading and unloading the freight at the predetermined positions.

To control the loading and unloading, a limit switch in the form of an actuator or a photoelectric transducer is customarily used as a detector. This limit switch detects whether the freight arrives at a predetermined position in the carrier vehicle or freight station where the freight is to be placed, in an attempt to stop the freight at the predetermined position upon such detection.

With this limit switch, however, partly since it would practically take a time to activate a drive source of the freight moving apparatus after the detection, and partly since the moment of inertia would be exerted on the freight moving apparatus while the freight is moving, it is difficult to stop the freight at the predetermined position so that the freight would be stop at staggered positions.

Consequently if the freight is not located in the predetermined position in the freight station in particularly, various troubles would occur in moving the freight to a station for a subsequent step of production by the carrier vehicle. For example, the freight moving apparatus would occasionally not reach the freight in the station so that the freight cannot be loaded on the carrier vehicle.

Further if the stroke of the freight moving apparatus can be controlled only from the trackless carrier vehicle, the carrier vehicle itself would tend to move in a staggering manner. Even though an attempt is made to move the carrier vehicle to the predetermined position and to stop there, the carrier vehicle would actually tend to be stopped considerably short of the predetermined position in the freight station so that the freight loaded on the carrier vehicle cannot be placed exactly at the predetermined position in the station, thus causing a trouble that the freight would be placed off the station.

SUMMARY OF THE INVENTION

It is therefore an object of this invention to provide a freight moving apparatus, in a carrier vehicle, for moving a freight exactly between a predetermined position in the carrier vehicle and a predetermined position in a freight station.

According to a first aspect of the invention, there is provided a freight moving apparatus comprising: a conveyor for receiving a freight and conveying the freight between a first predetermined position in a carrier vehicle and a second predetermined position in a freight station; an electric motor for driving the conveyor; stops disposed in the carrier vehicle and the freight station for engagement with the freight when the freight arrives at the first predetermined position or the second predetermined position; and a torque limiter for detecting any change of torque of the electric motor to deactivate the electric motor, which torque may be caused in the electric motor when the freight comes into engagement with the stops at the first predetermined position or the second predetermined position.

According to a second aspect of the invention, there is provided a freight moving apparatus comprising: a conveyor for receiving a freight and conveying the freight between a first predetermined position in a carrier vehicle and a second predetermined position in a freight station; an electric motor for driving the conveyor; and the conveyor including a horizontally movable block to be driven by the electric motor, a hook which is horizontally movable with the horizontally movable block and is vertically movable within the horizontally movable block when the latter arrives at the first predetermined position in the carrier vehicle, and mean for vertically moving the hook, the hook being adapted to be detachably engaged with a hook receiver provided on the freight.

Preferably the means for vertically moving the hook should be an electric actuator fixedly secured to the carrier vehicle.

The sequence of operations of the apparatus when the freight is moved from the freight station to the carrier vehicle, and vice versa will now be described.

The carrier vehicle with no freight loaded is brought to a predetermined position in the freight station by automatic operation, with a doorway of the carrier vehicle facing the freight station. Meanwhile in the freight station, the freight is placed on a roller conveyor at a predetermined position thereof, being ready to be moved. By the time the carrier vehicle stops, the horizontally movable block is moved to the doorway of the carrier vehicle, and the hook, which is integral with the horizontally movable block, is also located at the doorway of the carrier vehicle. At that time the electric actuator is located at the lowermost position, and the hook operatively connected with the electric actuator is also located at the lowermost position.

In this state, when the carrier vehicle arrives and stops at the predetermined position in the freight station, the electric motor starts driving the freight moving apparatus, the hook of the horizontally movable block is moved to the lower end of the hook receiver provided on the freight.

When the hook reaches the lower end of the hook receiver of the freight, the hook is brought into engagement with the hook receiver as the electric actuator is activated.

Then the electric motor starts reversely rotating to move the horizontally movable block and thence the hook horizontally to the predetermined position in the carrier vehicle. At that time the hook comes into engagement with the hook receiver, and the freight is moved, in response to the movement of the horizontally movable block, from the freight station onto the carrier vehicle. With continued driving of the electric motor, one side surface of the freight comes into contact with the stop located in the carrier vehicle so that a torque larger than the torque when moving a container is exerted on the electric motor. Upon detection of this large torque, a torque limiter breaks off the power source of the electric motor to stop the electric motor. Thus the freight has been moved to the predetermined position in the carrier and is in contact with the stop.

Thus when moving a freight loaded on the carrier vehicle to another freight station, the carrier vehicle is driven to the same station and is then stopped at a predetermined position in the manner described above. Also during this driving, the hook of the freight moving apparatus should preferably be kept in engagement with the hook receiver so that the freight is prevented from falling from the carrier vehicle or from being displaced on the carrier vehicle.

When it is confirmed by a suitable detector that the carrier vehicle has been stopped, the electric motor starts forwardly rotating to move the horizontally movable block horizontally toward the freight station. After the front (in the moving direction) surface of the horizontally movable block comes into contact with one side surface of the freight, the horizontally movable block continues moving to push the freight from the carrier vehicle to the freight station. Then when the front (in the moving direction) surface of the freight comes into contact with the stop in the freight station, a torque larger than when moving a container is exerted on the electric motor so that the torque limiter is activated to stop the electric motor. Thus the freight has been moved to the predetermined position in the freight station and in contact with the stop, whereupon the electric actuator is activated to disengage the hook from the hook receiver of the freight. Upon disengagement of the hook, the electric motor starts reversely rotating to return the hook to the doorway of the carrier vehicle, with the freight left in the freight station.

DETAILED DESCRIPTION

One embodiment of this invention will now be described with reference to the accompanying drawings.

Figure 1:
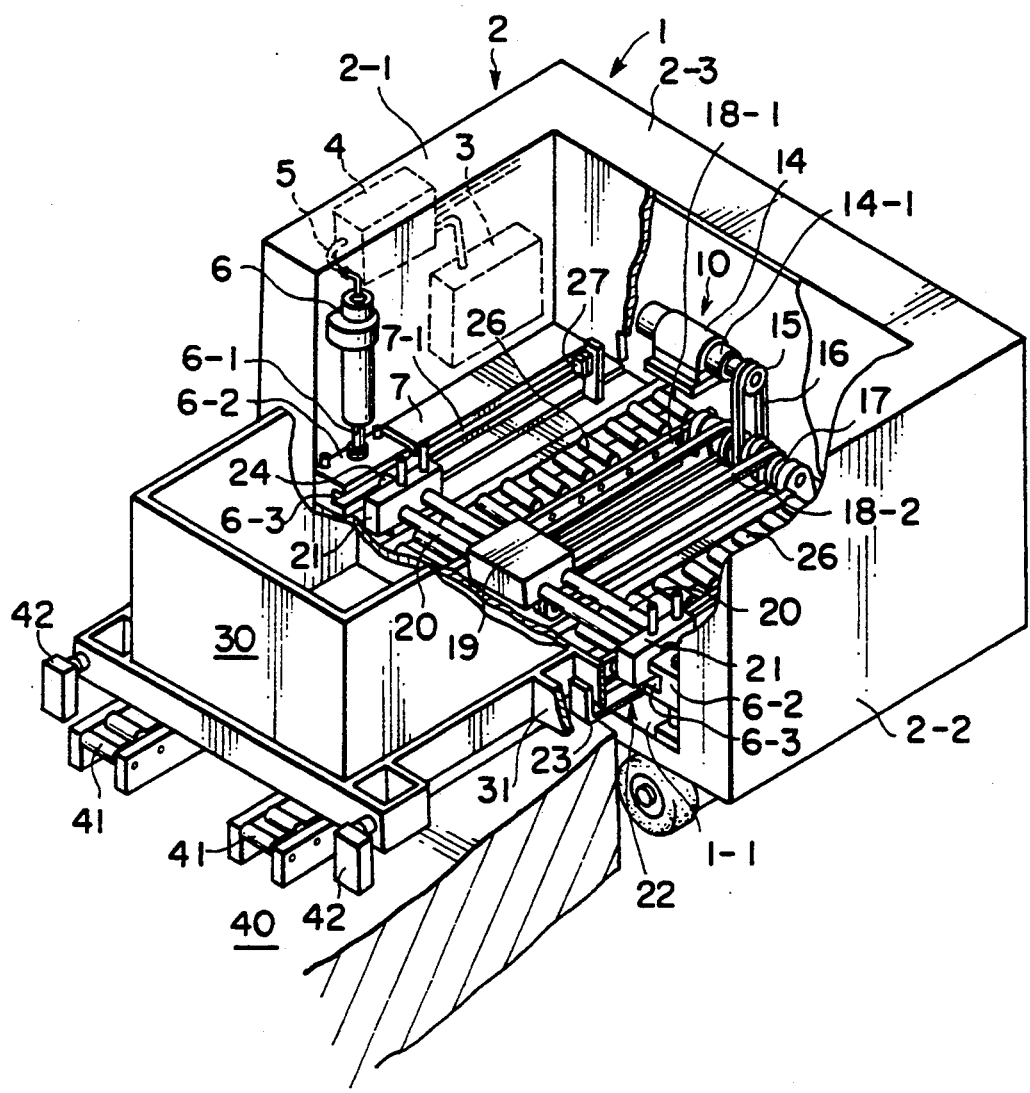
FIG. 1 is a perspective view, with parts broken away, of a freight moving apparatus embodying this invention.

FIG. 1 is a perspective view, with parts broken away, of a carrier vehicle 1 in which a freight moving apparatus 10 embodying this invention is incorporated.

The freight moving apparatus 10 comprises a pair of hook units 22, 22 engageable with a pair of hook receivers 31, 31 of a freight in the form of a container (hereinafter called "freight") 30, a conveyor unit (described below) mounted on a floor 1-1 of the carrier vehicle 1 for moving the freight 30 horizontally between the carrier vehicle 1 and a freight station 40 by a plurality (two in the illustrated embodiment) of conveyor belts 18-1, 18-2 which moves forwardly and backwardly the hook units 22, 22 horizontally, and an electric motor 14 for activating the conveyor unit.

Specifically, the carrier vehicle 1 has a composite wall 2 having a generally C-shaped cross section and composed of front, rear and side walls 2-1, 2-2, 2-3. The composite wall 2 has a hollow in which a battery 3, various kinds of electrical or hydraulic controls 4, various kinds of wirings or pipings 5 are contained.

The electric motor 14 is rotatable forwardly and reversely. As the electric motor 14 rotates forwardly and reversely, the conveyor belts 18-1, 18-2 are moved horizontally over the floor 1-1 of the carrier vehicle 1 via a drive pulley 15, a drive belt 16 and a follower pulley 17.

The electric motor 14 is equipped with a torque limiter 14-1 for detecting any change of torque which occurred due to such as overload of the electric motor 14 when the freight 30 comes in contact with stops 27, 27 in the carrier vehicle 1 or stops 42, 42 in the freight station 40, whereupon a switch is turned on to deactivate the electric motor 14.

The torque limiter 14-1 should by no means be limited to any specific type. For example, the torque limiter 14-1 may be a mechanical type in which the output shaft of the electric motor 14 and a cam are combined so as to be rotated in synchronization; when a drastic change of torque occurs due to overload, the cam is removed from the output shaft to turn off a limit switch, thus stopping the electric motor 14. Alternatively, the torque limiter 14-1 may be an electrical type in which a drastic change of voltage or current due to overload is detected to stop the electric motor 14. Partly since it is free from any misoperation and is easy to secure maintenance, and partly since it requires no other electrical control, the mechanical type limiter is compact and inexpensive and therefore advantageous, compared to the electrical type limiter.

Timing belts or chains are used as the drive belt 16 and conveyor belts 18-1, 18-2. The two conveyor belts 18-1, 18-2 extend horizontally over the floor 1 of the carrier vehicle 1 from the side wall 2-3 toward the open side. A belt-supported block 19 is fixedly secured onto the conveyor belts 18-1, 18-2. A pair of connecting rods 20 extends horizontally from each of opposite side surfaces of the belt-supported block 19 perpendicularly to the conveyor belts 18-1, 18-2 and terminates in a pair of distal ends to which a horizontally movable block 21 is fixedly secured.

Figure 2:
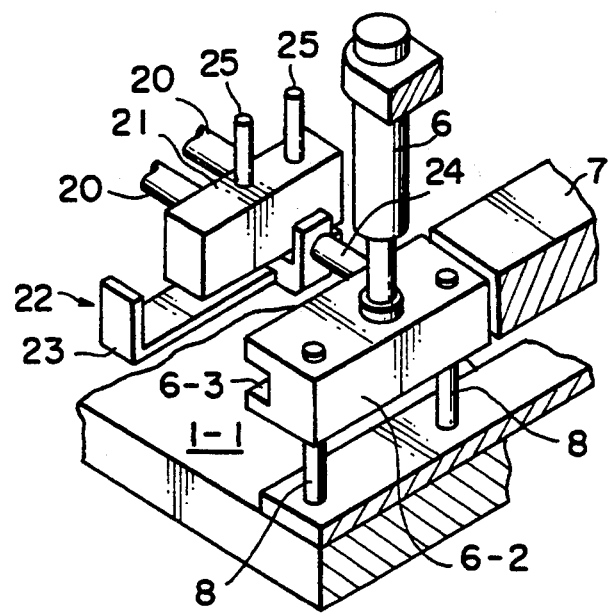
FIG. 2 is a perspective view showing a hook of the freight moving apparatus in an uppermost position.
Figure 3:
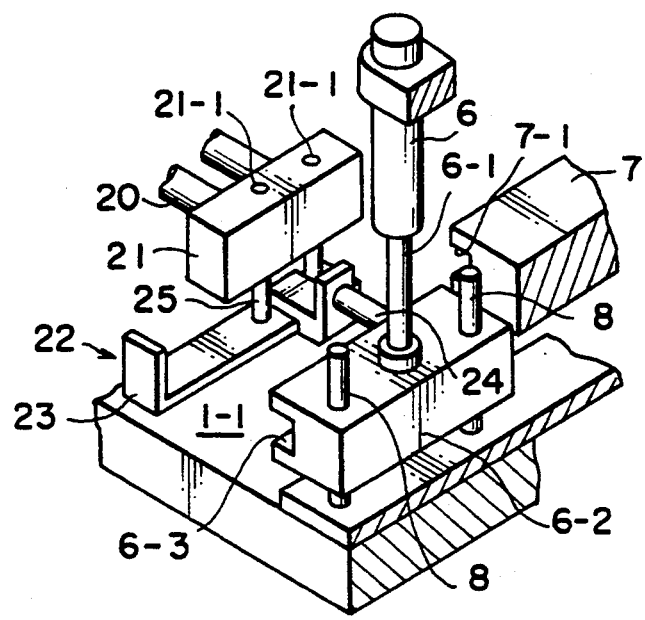
FIG. 3 is a similar to FIG. 2, showing the hook in a lowermost position.

As shown in FIGS. 1 through 3, the hook units 22, 22 are vertically movably supported by the respective horizontally movable blocks 21, 21. Each hook unit 22 includes a hook body 23, which is a generally inverted L-shaped plate having at its front end a hook, a horizontal guide rod 24 projecting perpendicularly from a side surface of the rear end of the hook unit 22, and a pair of front and rear vertical side rods 25, 25 projecting from an upper surface of the rear end of the hook body 23. The front and rear vertical slide rods 25, 25 are slidably inserted through a pair of vertical through holes 21-1, 21-1, respectively, of the horizontally movable block 21.

A pair of electric actuators 6, 6 are fixedly secured to the front and rear side walls 2-1, 2-2 of the carrier vehicle 1 at their respective inner surfaces toward the open side. The actuators 6, 6, as shown in FIG. 1, are operatively connected to the battery 3 via the control 4. To the distal end of a lower piston 6-1 of each actuator 6, the vertically movable block 6-2 is fixed or secured. Each of the two vertically movable blocks 6-2, 6-2 has in each other's inside surface a horizontal guide groove 6-3. At the uppermost position of each vertically movable block 6-2 associated with the respective (front or rear) side wall 2-1, 2-2, a guide member 7 having in its inner surface a horizontal guide groove 7-1 extends from the side wall 2-3 toward the open side and terminates short of the associated vertically movable block 6-2 so that the horizontal guide groove 7-1 communicates with the respective horizontal guide groove 6-3. A pair of front and rear vertical slide rods 8, 8 extends through the respective vertically movable block 6-2, being slidably inserted through a pair of vertical through holes in the vertically movable block 6-2.

Since the electric actuators 6, 6 are fixedly secured to the front and rear side walls 2-1, 2-2 of the carrier vehicle independently of the movable members of the freight moving apparatus, it is unnecessary to expand, shrink or bend the wires of the electric actuators 6, 6 when the individual movable member of the freight moving apparatus is moved by the electric motor 14, thus preventing the wires from being broken.

Each electric actuator 6 may be one type in which the cylinder is equipped with an electric motor so that rotation of the electric motor is converted into reciprocating linear motion of the piston rod, or another type in which the cylinder has therein an electromagnet and a spring so that the piston rod is reciprocatingly moved in response to activation and deactivation of the electromagnet.

The distal end of a guide rod 24 of each hook unit 22 is loosely received in the respective guide groove 6-3 or 7-1.

A pair of roller conveyors 26, 26 is mounted one on each side of the conveyor belts 18-1, 18-2, extending in a common direction over the floor 1-1 of the carrier vehicle 1. A stop 27 is located between each roller conveyor 26 and each guide member 7 and is mounted on the floor 1-1 toward the side wall 2-3.

As shown in FIG. 1, four hook receivers 31 each in a rectangular frame form are provided at four lower corners, respectively, of the freight 30, each hook receiver 31 opening both upwardly and downwardly.

A pair of roller conveyors 41, 41 is mounted on the upper surface of the freight station 40. The conveyors 41, 41 are spaced from each other equally and are aligned with the roller conveyors 26, 26. A pair of stops 42, 42 are mounted on the upper surface of the freight station 40 and the stops 42 are located on opposite sides of the two roller conveyors 41, 41 at the end positions corresponding to the stops 27, 27 on the carrier vehicle 1.

The operation of the freight moving apparatus will now be described with reference to FIGS. 4 through 7.

Figure 4:
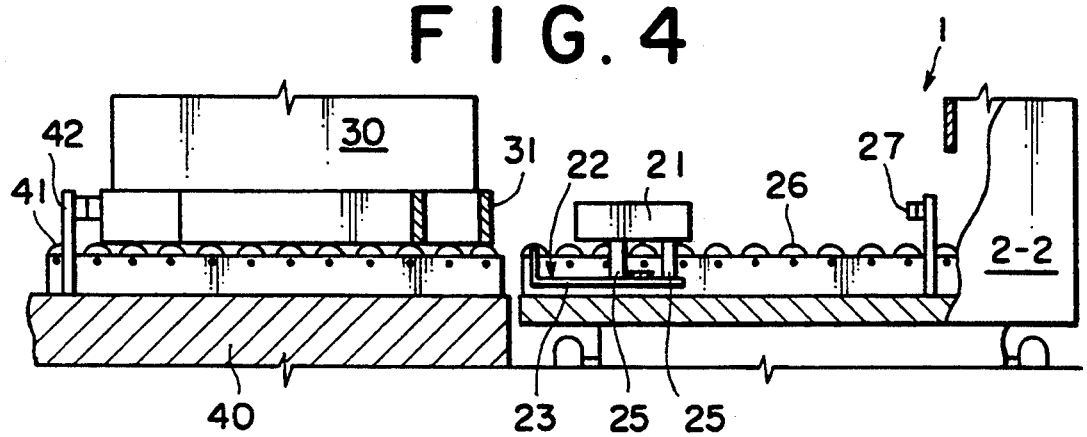
FIG. 4 is a side view, partly in cross section, of the freight moving apparatus, showing a carrier vehicle stopping near a freight station when a freight is to be moved.
Figure 5:
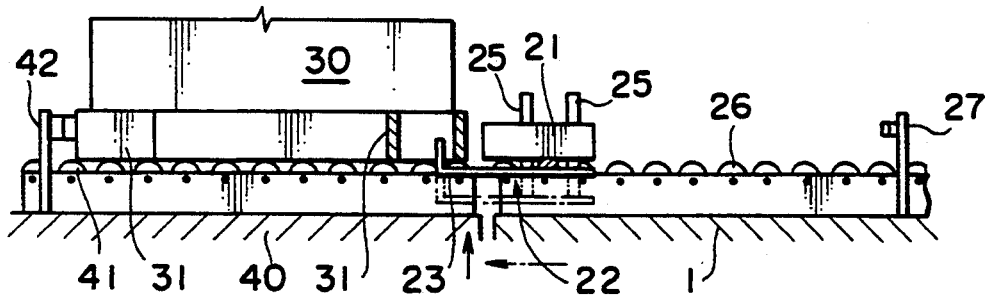
FIG. 5 is a side view, partly in cross section, of the freight moving apparatus, showing the hook in engagement with a hook receiver of the freight when the freight is to be moved.

FIGS. 4 through 7 show the sequence of operations of the freight moving apparatus when the freight 30 is moved from the freight station 40 to the carrier vehicle 1 and vice versa. In FIG. 4, the carrier vehicle 1 with no freight loaded is brought to a predetermined position in the freight station 40, with the open side of the carrier vehicle 1 facing the freight station 40. The running of the carrier vehicle 1 is performed unattendedly, and a photoelectric sensor is located at a suitable position in the freight station 40; the photoelectric sensor detects the carrier vehicle 1 and stops the carrier vehicle 1 at the predetermined position in the freight station 40.

Meanwhile, in the freight station 40, the freight 30 is already placed on the roller conveyors 41, 41 at the predetermined position thereof and is ready for being moved. The belt-supported block 19 and the horizontally movable block 21, 21 are moved to the open end of the carrier vehicle 1 until the carrier vehicle 1 is stopped, and the hook units 22, 22 moving horizontally as unified with the horizontally movable blocks 21, 21 and the vertical side rods 25, 25 is also moved to the open end of the carrier vehicle 1. At that time, the vertically movable blocks 6-2, 6-2 which are moved by the electric actuators 6, 6 are located at the lowermost position, and the hook bodies 23, 23 operatively connected with the vertically movable blocks 6-2, 6-2 via the guide rods 24, 24 received in the guide grooves 6-3, 6-3 of the vertically blocks 6-2, 6-2 are also located at the lowermost position, as shown in FIGS. 3 and 4.

In this state, when the carrier vehicle 1 arrives and stops at the predetermined position of the freight station 40, the electric motor 14 of the freight moving apparatus starts driving the horizontally movable blocks 21, 21 to move the hook bodies 23, 23 to a position beneath the hook receivers 31, 31 of the freight 30. When the hooks of the hook bodies 23, 23 arrive beneath the hook receivers 31, 31 of the freight, the electric actuators 6, 6 are energized to raise the vertically movable blocks 6-2, 6-2 as shown in FIG. 2, thus bringing the hooks of the hook bodies 23, 23 into engagement with the hook receivers 31, 31 as shown in FIG. 3.

Figure 6:
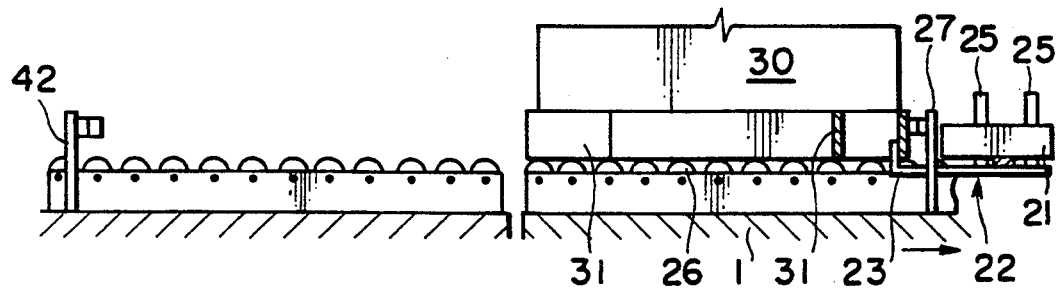
FIG. 6 is a side view, partly in cross section, of the freight moving apparatus, showing the manner in which the freight is moved onto the carrier vehicle.
Figure 7:
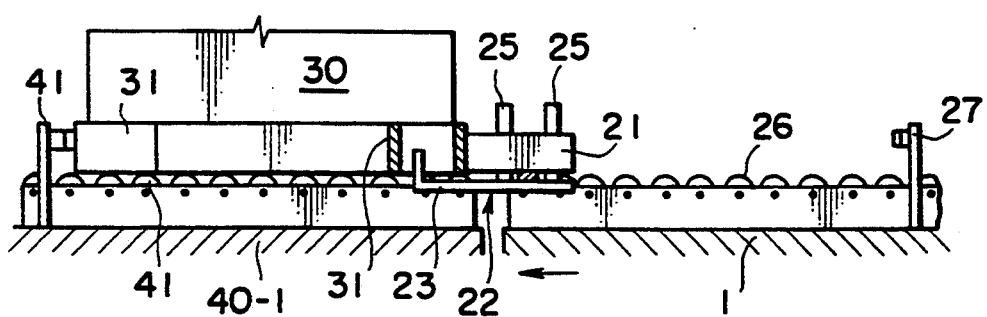
FIG. 7 is a side view, partly in cross section, of the freight moving apparatus, showing the manner in which the freight is moved into the freight station.

Then the electric motor 14 starts rotating reversely to move the hook units 22, 22 horizontally toward the side wall 2-3 of the carrier vehicle 1 via the conveyor belts 18-1, 18-2, the belt-supported blocks 19, 19, the connecting rods 20, 20, 20, 20 and the horizontally movable blocks 21, 21. At that time, the hooks of the hook bodies 23, 23 are engaged with the hook receivers 31, 31 of the freight 30, and in response to the movement of the horizontally movable blocks 21, 21, the freight 30 is moved from the roller conveyors 41, 41 of the freight station 40 onto the roller conveyors 26, 26 of the carrier vehicle 1. With continued driving of the electric motor 14, when one surface of the freight 30 comes into contact with the stops 27, 27 in the carrier vehicle 1, a torque larger than the torque when moving the freight is exerted On the electric motor 14; the torque limiter 14-1 detects this large torque, simultaneously breaks off the power to the electric motor 14, and thus stops the electric motor 14. Thus the freight 30 has been moved to the predetermined position in the carrier vehicle 1, which position has the freight 30 in contact with the stops 27, 27, as shown in FIG. 6.

When moving the freight 30 loaded on the carrier vehicle 1 to another station 40-1 for a subsequent manufacturing step, the carrier vehicle 1 is driven to the station 40-1 and is stopped at the predetermined station in the manner described above. Also during this driving, the hooks of the hook bodies 23, 23 of the freight moving apparatus are kept in engagement with the hook receivers 31, 31 of the freight 30 so that the freight 30 is prevented from falling from the carrier vehicle 1 or being displaced thereon.

When it is confirmed by a non-illustrated detector that the carrier vehicle 1 has been stopped, the electric motor 14 starts rotating forwardly to rotate the conveyor belts 18-1, 18-2 forwardly. In response to this forward rotation of the conveyor belts 18-1, 18-2, the horizontally movable blocks 21, 21 are moved horizontally toward the freight station 40-1. After their front (in the moving direction) surfaces come into contact with the one side surface of the freight 30, the horizontally movable blocks 21, 21 continue moving to push the freight 30 at one side surface, thus bringing the freight 30 from the carrier vehicle 1 to the freight station 40-1. When the front surface of the freight 30 comes into contact with the stops 42, 42 on the freight station 40-1, a torque larger than the torque when moving the freight 30 is exerted on the electric motor 14. In response to this larger torque, the torque limiter 14-1 is activated to stop the electric motor 14. Thus the freight 30 has been moved to the predetermined position in the freight station 40-1, which position has the freight in contact with the stops 42, 42 on the freight station 40-1. Subsequently, the electric actuators 6, 6 are energized to lower the vertically movable blocks 6-2, 6-2, thus removing the hooks of the hook bodies 23, 23 from the hook receivers 31, 31 of the freight 30. Upon removal of the hooks of the hook bodies 23, 23 from the hook receivers 31, 31, the electric motor 14 starts rotating reversely to return the hook bodies 23, 23 to the open portion of the carrier vehicle 1 with the freight 30 left on the freight station 40-1.

In this embodiment, partly since each hook receiver 31 is in a rectangular frame form, and partly since the hooks of the hook bodies 23, 23 are movable within the respective hook receivers 31, 31 to some degree of freedom, it is possible to absorb some error in engagement of the hooks of the hook bodies 23, 23. In this embodiment, the actuator is an electrically operated type. Alternatively, a fluid-operated actuator may be used; if a hydraulically operated actuator, for example, is used, it is necessary to mount in the carrier vehicle a drive source for such actuator. Nonetheless, an electric actuator is preferable from a view of compactness of the entire apparatus.

According to this invention, partly because of the stops and partly because the freight moving apparatus is operated by the electric motor equipped with a torque limiter, it is possible to move the freight precisely to a predetermined position in the carrier vehicle or the freight station so that the freight is prevented from falling, being displaced or misloaded. Further assuming that some degree of clearance is provided between the hook units of the freight moving apparatus and the hook receivers of the freight, since the hook units and the hook receivers can be interengaged reliably even if some error occurs in the stopped position of the hook units, it is possible to move the freight precisely.

Further since the actuators for moving the hook units vertically are fixedly secured to the carrier vehicle independently of the moving members of the freight moving apparatus, the wires or pipes associated with the actuators are prevented from expansion, shrinking or bending due to movement by the moving members, and are therefore free of any fear of being broken.

What is claimed is:

1. A freight moving apparatus for transferring freight between a freight station and a carrier vehicle, said apparatus comprising:

a carrier vehicle having a floor with a first conveyor means for shifting freight along the floor, first stops defining a first position for the freight on said first conveyor means;

a freight station having second conveyor means for moving freight along a surface of the station, said station having second stops for defining a second position for the freight on said second conveyor means;

means for positively moving the freight between the first and second positions including a block movable along a horizontal path along the floor of the carrier vehicle between a third position with the freight engaging the first stops and a fourth position with the freight being transferred to the second conveyor means and engaging the second stops, a hook being mounted on the block for vertical movement relative to the block, an electric motor for driving the block along the horizontal path between the third and fourth positions, means for shifting the hook vertically between a retracted position and an engaged position as the block is adjacent said fourth position, control means for stopping the electric motor when the freight engages one of the stops, said control means including a torque limiter for detecting any change of torque of the electric motor when the freight engages the stop; and said freight being provided with hook receivers for engagement by said hook when the hook is moved vertically upward from the retracted position to the engaging position so that when the freight is in said second position and the block is in said fourth position, said means for shifting the hook is actuated to engage the hook in the hook receivers and the electric motor is the actuated to shift the block from the fourth position toward the third position to shift the freight to the first position.

2. A freight moving apparatus according to claim 1, wherein the means for positively moving further includes guide means for the block, said guide means including a channel section receiving a pin connected to the hook with a short second section being positioned for receiving the pin as the block is in said fourth position, said means for shifting the hook vertically including said short section being mounted for vertical movement and an actuator for moving said short section vertically to move the hook between the engaged and retracted positions.

* * * * *